(12) United States Patent
Miller et al.

(10) Patent No.: US 8,977,839 B2
(45) Date of Patent: Mar. 10, 2015

(54) METHOD AND APPARATUS FOR SELF CONFIGURATION OF LTE E-NODE BS

(75) Inventors: James M. Miller, Verona, NJ (US); Peter S. Wang, E. Setauket, NY (US); Ulises Olvera-Hernandez, Kirkland (CA)

(73) Assignee: InterDigital Technology Corporation, Wilmington, DE (US)

( * ) Notice: Subject to any disclaimer, the term of this patent is extended or adjusted under 35 U.S.C. 154(b) by 1128 days.

(21) Appl. No.: 11/875,693

(22) Filed: Oct. 19, 2007

(65) Prior Publication Data

US 2008/0098467 A1     Apr. 24, 2008

Related U.S. Application Data

(60) Provisional application No. 60/862,341, filed on Oct. 20, 2006.

(51) Int. Cl.
*H04L 29/06* (2006.01)

(52) U.S. Cl.
USPC .............................. 713/1; 455/561; 709/222

(58) Field of Classification Search
CPC ......... H04L 41/0806; H04W 36/0066; H04W 64/00; H04W 48/18; H04W 88/08; H04W 88/085; H04M 2207/18
See application file for complete search history.

(56) References Cited

U.S. PATENT DOCUMENTS

| | | | |
|---|---|---|---|
| 5,613,211 A | 3/1997 | Matsuno | |
| 6,041,228 A * | 3/2000 | Niska et al. | 455/419 |
| 6,081,229 A * | 6/2000 | Soliman et al. | 342/357.42 |
| 7,024,688 B1 | 4/2006 | Faccin et al. | |
| 7,035,637 B2 * | 4/2006 | Motegi et al. | 455/435.1 |
| 7,099,694 B1 | 8/2006 | Aramaki et al. | |
| RE40,966 E * | 11/2009 | Niska et al. | 455/419 |
| 7,681,031 B2 * | 3/2010 | Matusz et al. | 713/151 |
| 8,024,000 B2 * | 9/2011 | Wang et al. | 455/561 |
| 8,364,119 B2 * | 1/2013 | Reudink | 455/405 |
| 8,498,616 B2 * | 7/2013 | Voyer et al. | 455/411 |
| 2002/0123365 A1 * | 9/2002 | Thorson et al. | 455/524 |
| 2002/0151300 A1 | 10/2002 | Suda et al. | |
| 2002/0151308 A1 * | 10/2002 | Baba et al. | 455/446 |
| 2002/0152378 A1 | 10/2002 | Wallace, Jr. et al. | |
| 2002/0193116 A1 | 12/2002 | Agrawal et al. | |
| 2003/0076803 A1 * | 4/2003 | Chuah | 370/338 |
| 2003/0109254 A1 * | 6/2003 | Motegi et al. | 455/435 |
| 2003/0119481 A1 * | 6/2003 | Haverinen et al. | 455/411 |

(Continued)

FOREIGN PATENT DOCUMENTS

| | | |
|---|---|---|
| EP | 1 365 609 | 11/2003 |
| GB | 2 392 799 | 3/2004 |

(Continued)

OTHER PUBLICATIONS

3GPP TSG RAN WG#53, "Standardisation policy for plug and play RAN", NTT DoCoMo, Inc.; Aug. 28-Sep. 1, 2006; R3-061071.

(Continued)

*Primary Examiner* — Michael R Vaughan
(74) *Attorney, Agent, or Firm* — Yasser Mourtada

(57) ABSTRACT

The present invention is a procedure for a self configuring eNB/E-UTRAN. The eNB/E-UTRAN interacts with the Enhanced Packet Core (EPC) of the LTE network in order to complete the mutual authentication task between the eNB and the EPC and other operating procedures in the eNB self configuration phase.

22 Claims, 8 Drawing Sheets

(56) References Cited

U.S. PATENT DOCUMENTS

| | | | |
|---|---|---|---|
| 2003/0200433 A1* | 10/2003 | Stirbu | 713/169 |
| 2005/0026597 A1 | 2/2005 | Kim et al. | |
| 2005/0041638 A1* | 2/2005 | Peng | 370/352 |
| 2005/0107095 A1 | 5/2005 | Samuel | |
| 2005/0117543 A1* | 6/2005 | Heath et al. | 370/329 |
| 2005/0239484 A1 | 10/2005 | Park et al. | |
| 2006/0014541 A1* | 1/2006 | Kato | 455/446 |
| 2006/0035661 A1 | 2/2006 | Niwano et al. | |
| 2006/0123021 A1 | 6/2006 | Byers | |
| 2007/0047451 A1 | 3/2007 | Lohr et al. | |
| 2007/0105549 A1 | 5/2007 | Suda et al. | |
| 2007/0173259 A1 | 7/2007 | Akihara | |
| 2007/0281708 A1 | 12/2007 | Bakhuizen et al. | |
| 2007/0291674 A1* | 12/2007 | Cheng et al. | 370/312 |
| 2007/0291770 A1* | 12/2007 | Kitazoe | 370/395.52 |
| 2007/0297367 A1* | 12/2007 | Wang et al. | 370/331 |
| 2008/0080399 A1* | 4/2008 | Wang et al. | 370/254 |
| 2008/0102794 A1* | 5/2008 | Keevill et al. | 455/411 |
| 2008/0141094 A1* | 6/2008 | Vayanos et al. | 714/751 |
| 2008/0167003 A1* | 7/2008 | Wang et al. | 455/411 |
| 2008/0225797 A1* | 9/2008 | Kim | 370/331 |
| 2008/0318586 A1* | 12/2008 | Niwano et al. | 455/450 |
| 2009/0016254 A1* | 1/2009 | Lee et al. | 370/312 |
| 2009/0021572 A1 | 1/2009 | Garudadri et al. | |
| 2009/0059835 A1* | 3/2009 | Motegi et al. | 370/312 |
| 2009/0247163 A1* | 10/2009 | Aoyama | 455/436 |
| 2009/0285144 A1* | 11/2009 | Motegi et al. | 370/312 |
| 2009/0290509 A1* | 11/2009 | Vujcic et al. | 370/254 |
| 2010/0167746 A1* | 7/2010 | Lee et al. | 455/450 |
| 2010/0235634 A1* | 9/2010 | Fischer | 713/168 |

FOREIGN PATENT DOCUMENTS

| | | |
|---|---|---|
| JP | 07-193859 | 7/1995 |
| JP | 2000-354048 | 12/2000 |
| JP | 2003-249944 | 9/2003 |
| JP | 2003-274011 | 9/2003 |
| JP | 2006-060850 | 3/2006 |
| KR | 10-2006-0063618 A | 6/2006 |
| RU | 2005 107 331 A | 8/2005 |
| TW | 200400720 | 1/2004 |
| TW | 580837 | 3/2004 |
| WO | WO-96/14720 | 5/1996 |
| WO | WO-00/69199 | 11/2000 |
| WO | WO-00/77981 | 12/2000 |
| WO | WO-03/049486 A2 | 6/2003 |
| WO | WO-2005/051024 | 6/2005 |
| WO | WO-2005/125249 A1 | 12/2005 |
| WO | WO-2006/010953 A2 | 2/2006 |
| WO | WO-2006/025654 | 3/2006 |

OTHER PUBLICATIONS

3$^{rd}$ Generation Partnership Project; Technical Specification Group Services and System Aspects; 3GPP System Architecture Evolution: Report on Technical Options and Conclusions (Release 7); 3GPP TR 23.882 V1.4.2 (Oct. 2006).

3$^{rd}$ Generation Partnership Project; Technical Specification Group Services and System Aspects; 3GPP System Architecture Evolution: Report on Technical Options and Conclusions (Release 7); 3GPP TR 23.882 V1.11.0 (Jul. 2007).

Kaufman "Internet Key Exchange (IKEv2) Protocol"; RFC 4306; Dec. 2005.

Kent et al. "Security Architecture for the Internet Protocol"; RFC 4301; Dec. 2005.

NTT DoCoMo, "Clarification of functions for self-optimization and self-configuration," 3GPP TSG RAN WG3 #53bis, R3-061509 (Oct. 10-13, 2006).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release x)," 3GPP TS 36.300 V0.1.0 (Oct. 2006).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.2.0 (Sep. 2007).

T-Mobile, "Self-Configuration and Self-Optimisation, Problem Statement and Definition," 3GPP TSG-RAN WG3 #53bis, R3-061487 (Oct. 10-13, 2006).

T-Mobile, "Support for self-configuration and self-optimisation, Proposal for Stage2," 3GPP TSG-RAN WG2 #54, R2-062411 (Aug. 28-Sep. 1, 2006).

"Taiwan Office Action", Taiwan Application No. 096139408, May 31, 2013, 10 Pages.

"Taiwan Office Action (Translation)", Taiwan Application No. 096139408, May 31, 2013, 7 Pages.

"3rd Generation Partnership Project; Technical Specification Group Radio Access Network; Evolved Universal Terrestrial Radio Access (E-UTRA) and Evolved Universal Terrestrial Radio Access Network (E-UTRAN)l Overall Description; Stage 2 (Release 8)", 3GPP TS 36.300 V0.3.1, Nov. 2006, 74 pages.

"3rd Generation Partnership Project; Technical Specification Group Radio Access Network; S1 Application Protocol (S1AP) (Release 8)", 3GPP TS 36.413 V8.0.0, Dec. 2007, 125 pages.

"3rd Generation Partnership Project; Technical Specification Group Radio Access Network; X2 Application Protocol (X2AP) (Release 8)", 3GPP TS 36.423 V8.0.0, Dec. 2007, 60 pages.

"3rd Generation Partnership Project; Technical Specification Group Services and System Aspects; 3G Security; Security Architecture (Release 5)", 3GPP TS 33.102 V5.7.0, Dec. 2005, 61 pages.

"3rd Generation Partnership Project; Technical Specification Group Services and System Aspects; 3G Security; Security Architecture (Release 5)", 3GPP TS 33.102 V5.5.0, Sep. 2004, 61 pages.

"3rd Generation Partnership Project; Technical Specification Group Services and System Aspects; 3G Security; Security Architecture (Release 6)", 3GPP TS 33.102 V6.5.0, Dec. 2005, 63 pages.

"3rd Generation Partnership Project; Technical Specification Group Services and System Aspects; 3G Security; Security Architecture (Release 7)", 3GPP TS 33.102 V7.1.0, Dec. 2006, 64 pages.

"Diffie-Hellman key exchange", Wikepedia, The Free Encyclopedia http://en.wikipedia.org/w/index.php?title=diffie-hellman_key_exchange&oldid=178082936, Nov. 14, 2007, 6 Pages.

"EUTRAN Architecture Description for 25.912", 3GPP TSG RAN WG3 Meeting #52, R3-060732, May 8-12, 2006, Shanghai, China, May 2006, 4 pages.

"IPsec", Wikipedia, The Free Encyclopedia http://en.wikipedia.org/w/index.php?title=IPsec&okdid=178971633, Nov. 14, 2007, 6 Pages.

"Tolkovy Solvar po Vychislitelnoi Tekhnike", The Explanatory Dictionary of Computing, Moscow Publishing Department "Russkaya Redaktsia", 1995, 2 Pages.

Ericsson, "IP Multi-cast Signalling for Application Protocols", 3GPP TSG-RAN WG3 # 54, Riga, Latvia, Tdoc R3-061778, Nov. 6-10, 2006, 7 pages.

Ericsson, "Text Proposal on PDCP sublayer for TR 25.813, Section 5.3.3", 3GPP TSG RAN WG2x Meeting #53, Shanghai, China, Tdoc R2-061716, May 8-12, 2006, 2 pages.

Mao, Wenbo, "Modern Cryptography: Theory and Practice", Prentice Hall, 2003; p. 250-251, 2003, 2 Pages.

Nokia, "Discussion of Threats against eNB and Last-Mile in Long Term Evolved RAN/3GPP System Architecture Evolution", 3GPP TSG-SA WG3 Security—53#42, Bangalore, India, S3-060034, Feb. 6-9, 2006, 4 pages.

Nokia, Siemens, Ericsson, Vodafone, Huawei, et al., "Updated Version of 'Rationale And Track Of Security Decisions In Long Term Evolved RAN/3GPP System Architecture Evolution'", 3GPP TSG SA WG3 (Security) meeting #45, Ashburn, USA, S3-060706, Oct. 31-Nov. 3, 2006, 45 pages.

Stewart, "Stream Control Transmission Protocol", Network Working Group, Request for Comments: 4960, Sep. 2007, 153 pages.

* cited by examiner

METHOD AND APPARATUS FOR SELF CONFIGURATION OF LTE E-NODE BS

CROSS REFERENCE TO RELATED APPLICATION

This application claims the benefit of U.S. provisional Application No. 60/862,341, filed on Oct. 20, 2006, which is incorporated by reference as if fully set forth.

FIELD OF INVENTION

The present invention relates to wireless communication systems.

BACKGROUND

The Third Generation Partnership Project (3GPP) has initiated the Long Term Evolution (LTE) program to bring new technology, new network architecture, new configurations, and new applications and services to wireless cellular networks in order to provide improved spectral efficiency and faster user experiences. LTE also requires a low maintenance system in terms of network deployment and runtime service optimization. This is the background for the current LTE evolved universal terrestrial radio access network (E-UTRAN) Self Configuration and Self Optimization work effort.

Prior to LTE, the UTRAN architecture of the currently used 3GPP universal mobile telecommunications system (UMTS) is shown in FIG. 1. The radio access network or radio network system (RNS) or the UTRAN 10 comprises one or more radio network controllers (RNC) 11 and one or more Node-Bs 12. The configurations and operations of deployed Node-Bs 12 currently are totally controlled by RNC 11 using explicit commands over Iub link 13. Any configurations and service upgrades of Node-Bs 12 depend on RNC 11 and other cell engineering and planning efforts. Currently, there is no ability or requirements that exist for self configuration and optimization of Node Bs by the Node B.

Accordingly, a method and apparatus for self configuring LTE evolved Nodes-Bs (eNBs) are desired.

SUMMARY

A method and apparatus are disclosed for a self configuring eNB/E-UTRAN. The eNB/E-UTRAN interacts with the Evolved Packet Core (EPC) of the Long Term Evolution (LTE) network in order to complete the mutual authentication task between the eNB and the EPC, and other operating procedures in the eNB self configuration phase.

DETAILED DESCRIPTION

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

Figure 1:
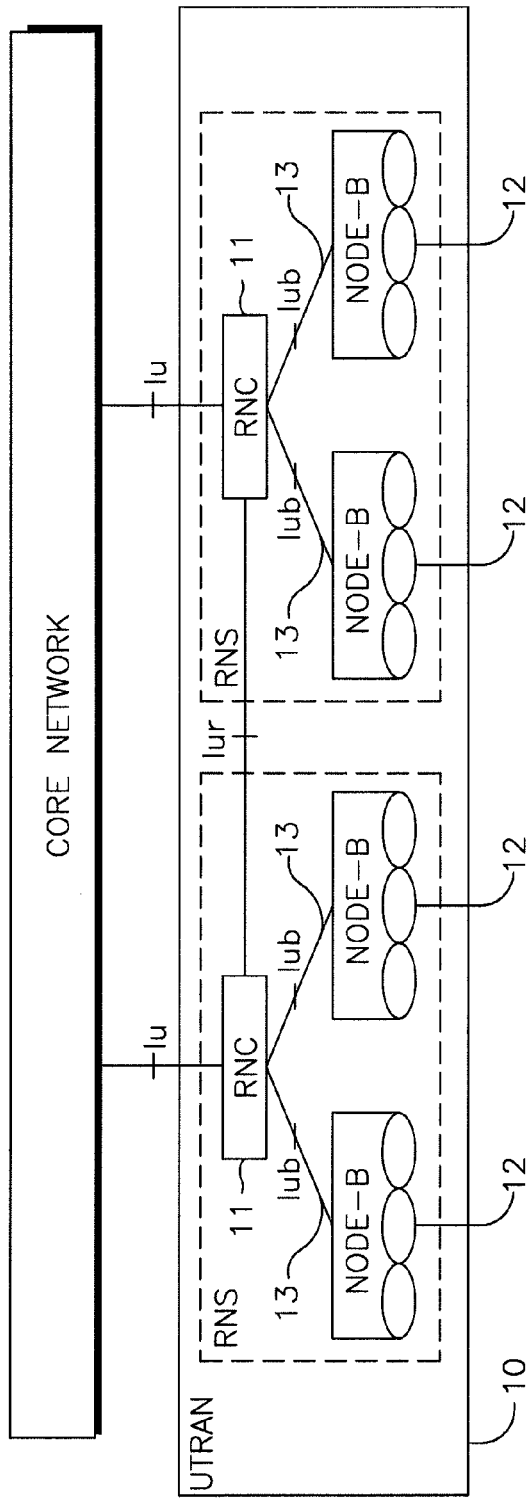
FIG. 1 is a block diagram of the current 3GPP UTRAN architecture.
Figure 2:
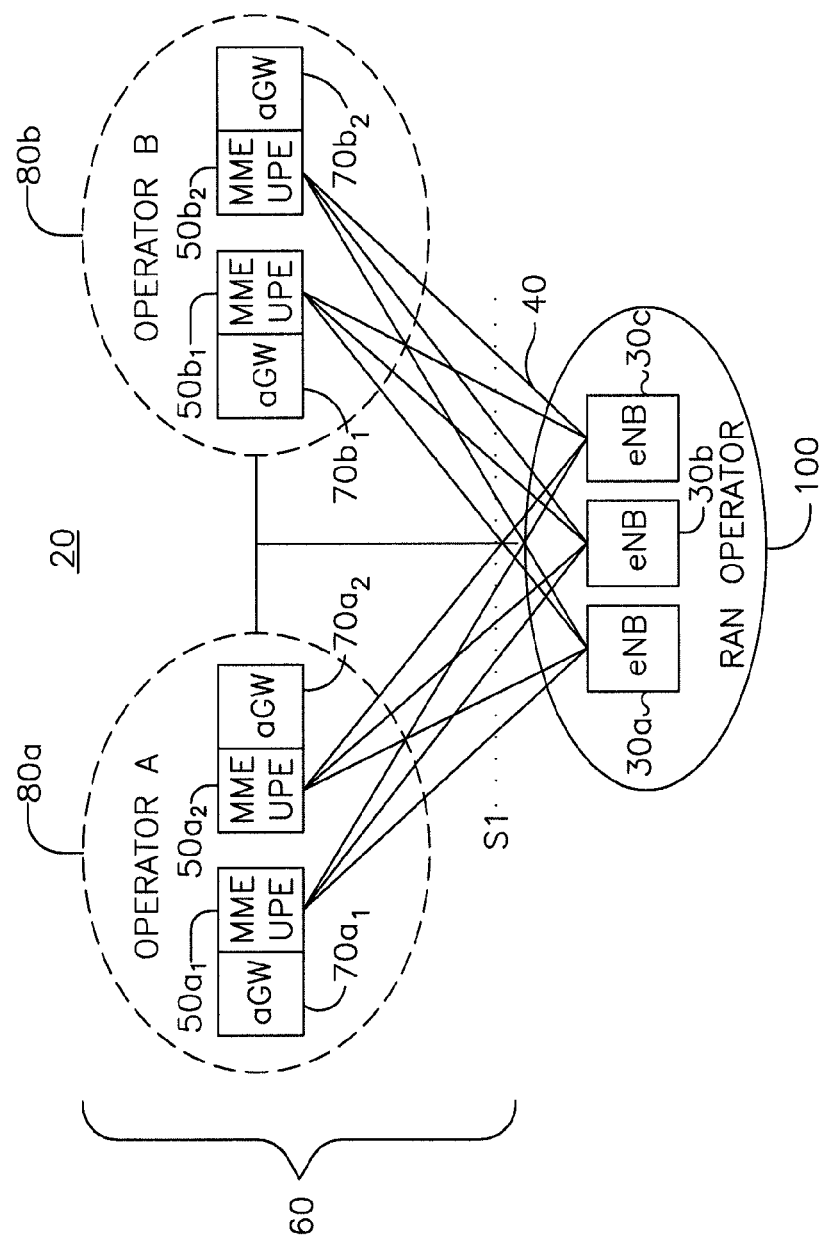
FIG. 2 is a block diagram of an example Long Term Evolution (LTE) E-UTRAN network sharing architecture.

An eNB is disclosed that is linked directly with the EPC and among other eNBs and performs the radio access network functionality for E-UTRAN. An example LTE system 20 including the disclosed self configuring eNB is illustrated in FIG. 2. LTE system 20 comprises an EPC network 80 and a radio access network (RAN) operator 100. RAN operator 100 comprises one or more eNBs 30 (i.e., 30a, 30b and 30c).

Figure 3:
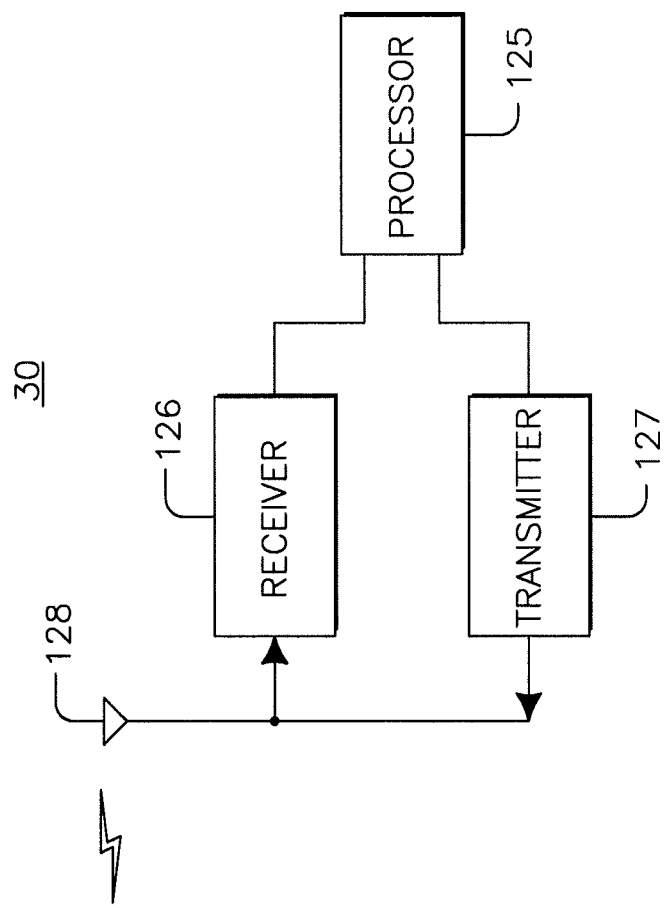
FIG. 3 is a block diagram of an example eNB.

FIG. 3 is an example of a functional block diagram of an eNB 30. In addition to components included in a typical transceiver, eNB 30 includes a processor 125, configured to perform self configuration, as disclosed below. The eNB further includes a receiver 126 in communication with the processor 125, a transmitter 127 in communication with the processor 125, and an antenna 128 in communication with the receiver 126 and the transmitter 127 to facilitate the transmission and reception of wireless data.

Referring back to FIG. 2, EPC 60 coupled to the one or more eNBs 30 through S1 link 40, comprises one or more mobility management entities/User Plane Entities (MME UPEs) 50 and an access gateway (aGW) 70. As those having skill in the art know, S1 link 40 provides support for load sharing of traffic across network elements in EPC 60, MME UPEs 50 and aGWs 70, by creating pools of MME UPEs 50 and aGWs 70 and allowing each eNB 30 to be connected to multiple MME UPEs 50 and aGWs 70 in a pool. MME UPE 50, coupled to aGW 70, assists EPC 60 in choosing a serving aGW for eNB 30. Also coupled to MME UPE 50 is eNB 30 through S1 link 40.

In accordance with the present teaching, eNBs 30 assume the radio access network (RAN) configuration, operation and management control functions as well as the radio interface configurations and operations. The eNBs further interact directly with EPC 60, as well as, with neighboring eNBs 30 or other network nodes to directly handle WTRU Mobility management tasks.

Disclosed self configuring eNB 30 is coupled to one or more aGWs 70 and MME UPEs 50 belonging to different network operator/service providers 80, either physically or logically. In the disclosed method, self configuring eNB 30 performs eNB authentication through the primary operator's serving aGW interface.

Primary network operators 80, Operator 80a and 80b for example, may include more than one aGWs 70a, 70b (e.g., $70a_1$ and $70a_2$, $70b_1$ and $70b_2$, respectively) from an aGW pool currently connecting to eNB 30. Each individual aGW 70a, 70b could potentially serve as the serving aGW for eNB 30. It is the primary operator's responsibility for assigning one of the aGW to act as the serving aGW (towards this eNB) for the eNB upon initial configuration to the EPC 60. eNB 30 is then able to interact with the designated serving aGW in the primary operator's network 80, and through which eNB 30 performs the eNB authentication and E-UTRAN operating parameter acquisition.

For purposes of this disclosure, a primary operator is defined as the network operator or service provider that deploys the eNB in concert with the Public Land Mobile Network Id (PLMN-Id). A serving aGW is defined as the aGW that currently bridges to the network designated entity (such as an O&M or an authentication center (AuC), not shown) and interacts over S1 C-plane of S1 links 40 with the eNB 30 for a specific task, such as eNB self configuration.

Preferably, eNB 30 belongs to the primary (deploying) operator, Operator A 80a in the example illustrated in FIG. 2, and therefore is self configured by its own operator, thereby serving not only the standardized functionalities to the LTE networks, (primary or non-primary operator's networks), but also the deploying operator's specific features or functionalities.

As such, the eNB authentication and E-UTRAN operating parameter acquisition in the eNB self configuration phase are conducted with the primary operator's serving aGW. The acquisition and authentication is performed only once with each eNB 30 power up session. The result of the actions with the primary operator network 80 shall enable eNB 30 to obtain information and policies regarding how to interact with the rest of non-primary operator's networks 80b.

Given the multiplicity of S1 links 40 to an eNB 30, a port/address/interface identity is used by eNB 30 to start the eNB authentication and E-UTRAN parameter acquisition. If the multiplicity is realized physically, (i.e. there are as many physical links/wires connecting to the eNB), each S1 link 40 ending at a different aGW 70, a primary S1 link port, physically connecting the port to the primary operator's network 80 (may also be the primary operator's serving aGW for the eNB) may be used in one disclosed method of eNB authentication. The advantage of this architecture is that it avoids the overhead required when running a node resolution procedure, to be disclosed below. However, this architecture requires the installation be primary-operator-serving-aGW sensitive.

If the IP address (or a fully qualified domain name or URL) of the primary operator's serving aGW (for initialization) is pre-configured to the eNB (may be together with all other aGWs), then in another disclosed method of eNB authentication self configuring eNB 30 may rely on the underlying IP network to connect the serving aGW given only the destination IP address.

In yet another method of authentication, the eNB parameters may be pre-configured and stored in an universal integrated circuit card (UICC) device, for example, for easy retrieval and update.

In a preferred method of eNB authentication, the multiple S1 links 40 are logically distinctive. As such, a node resolution method is preferably used to aid self configuring eNB 30 in identifying the primary operator's 80a serving aGW and to obtain necessary information regarding the connected aGWs 70.

Upon power up and initialization, an upcoming eNB 30 reads the UICC device for its pre-configured identities, such as the eNB-Id and its deploying operator's identity, the public land mobile network (PLMN)-Id, as well as, certain of its security parameters such as the shared-secret-key among eNBs 30a and aGWs 70 for initial serving aGW resolution. The key shall be configured to eNB 30a with a UICC device or other secure methods. It is preferable that a self protecting UICC provide access with the required identity to operate and also be able to destroy or conceal all data and functions upon illegal access, such as pulling out of the card slot without proper release steps.

Figure 4:
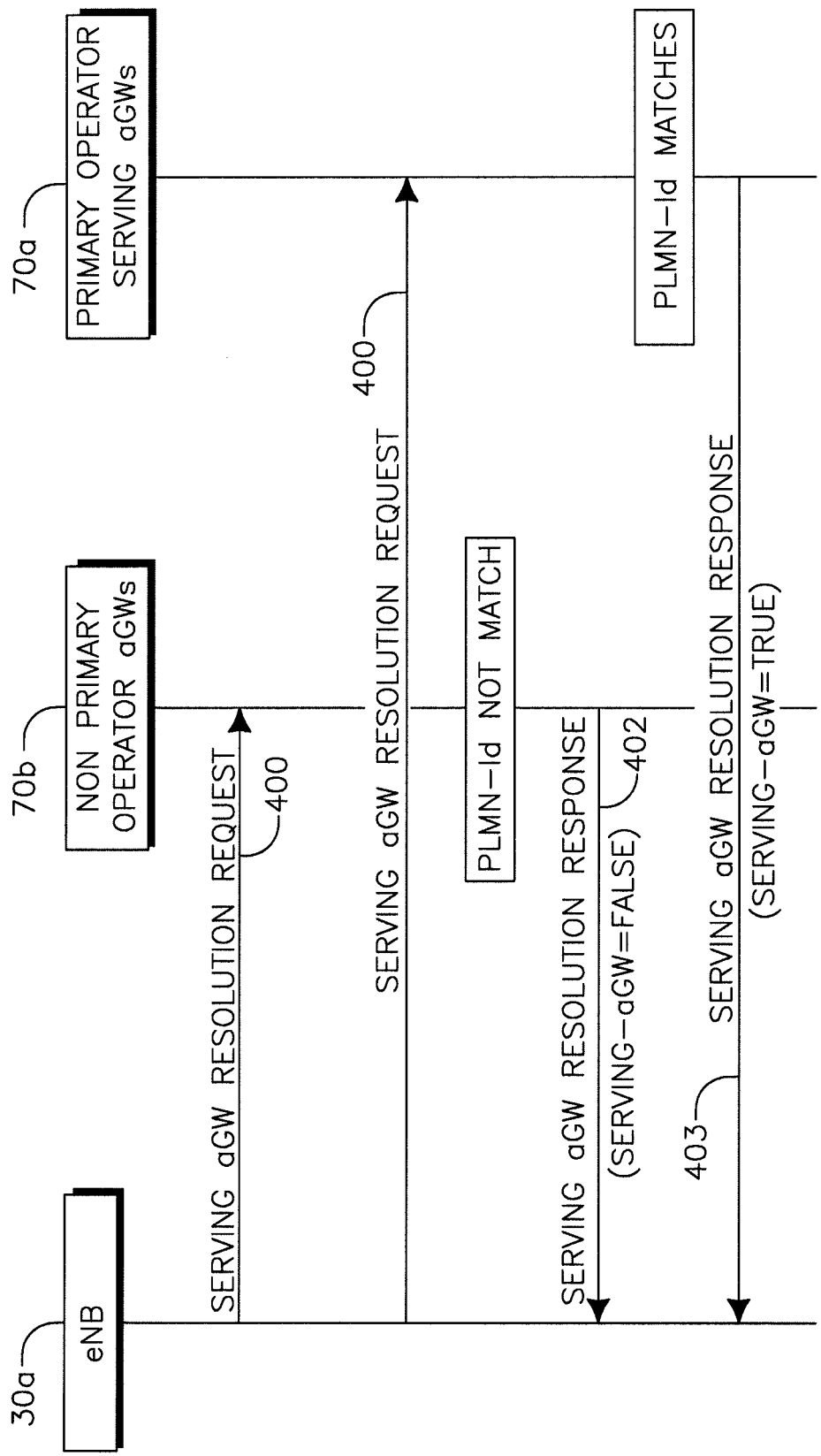
FIG. 4 is an example signal diagram for primary operator serving access gateway (aGW) resolution and IP address acquisition.

FIG. 4 illustrates an example signal diagram of a disclosed eNB method for primary operator serving aGW resolution and IP address requisition. Once eNB 30 has obtained its eNB-ID, PLMN-ID and the like, self configuring eNB 30 broadcasts to all connecting aGW interfaces, or sends to each aGW, 70$a_1$, 70$a_2$, (Primary Operator 80a) 70$b_1$, 70$b_2$, (Non-primary Operator 80b) a "Serving aGW Resolution Request" message 400 with encoded (encoding with a shared-secret-key to prevent general identity steal by wire mapping) eNB-Id and PLMN-Id, for example. Other eNB credentials may also be used for encoding the request, including a request type (Req_Type) of one from <Initial deployment, eNB restart, eNB relocation> to identify the respective eNB self configuration scenarios.

Alternatively, an eNB location identity (generated by fresh global positioning system (GPS) measurement of longitude, latitude, and/or altitude and converted to a single eNB-location-Id and normalized) may also be included in the "Serving aGW Resolution Request" message to disclose the geographical location of eNB 30 at initial deployment or at eNB relocation to prevent the possible fraud of eNB impersonation.

Each aGW 70$a_1$, 70$a_2$, 70$b_1$, 70$b_2$ that receives the serving aGW Resolution Request then checks to see if the PLMN-Id matches its own PLMN-Id to determine whether it is eNB's 30a primary operator. aGW(s) (70$a_1$, 70$a_2$ in this example) with matching PLMN-Id will further check the eNB-Id to determine if it is the serving aGW (among many in the aGW pool) for requesting eNB 30a (up to the service distribution and assignment of the primary operator). The serving aGW will then gather operational information for the eNB. In the example illustrated in FIG. 2, the serving aGW is designated 70a for eNB 30a.

Serving aGW 70a then replies to eNB 30a using a "Serving aGW Resolution Response" signal 403 with the field serving-aGW=TRUE. The reply may also include other identities and other parameters for subsequent procedures and operations.

In an alternative method, all other non-primary operators 80b and non-serving aGWs 70$b_1$, 70$b_2$ may also learn about the upcoming eNB 30a and reply with a serving aGW Resolution Response 402 with a field serving-aGW=FALSE and its identities such as the aGW-Id and the PLMN-Id, and the like.

As self configuring eNB 30a has received serving aGW's 70$a_1$ positive response and its IP address derived, eNB 30a then activates the IPsec security setup with a Security Association and "Internet Key Exchange Protocol" procedures to the underlying IP layer to enable the secure link between eNB 30a and the serving aGW 70.

Figure 5:
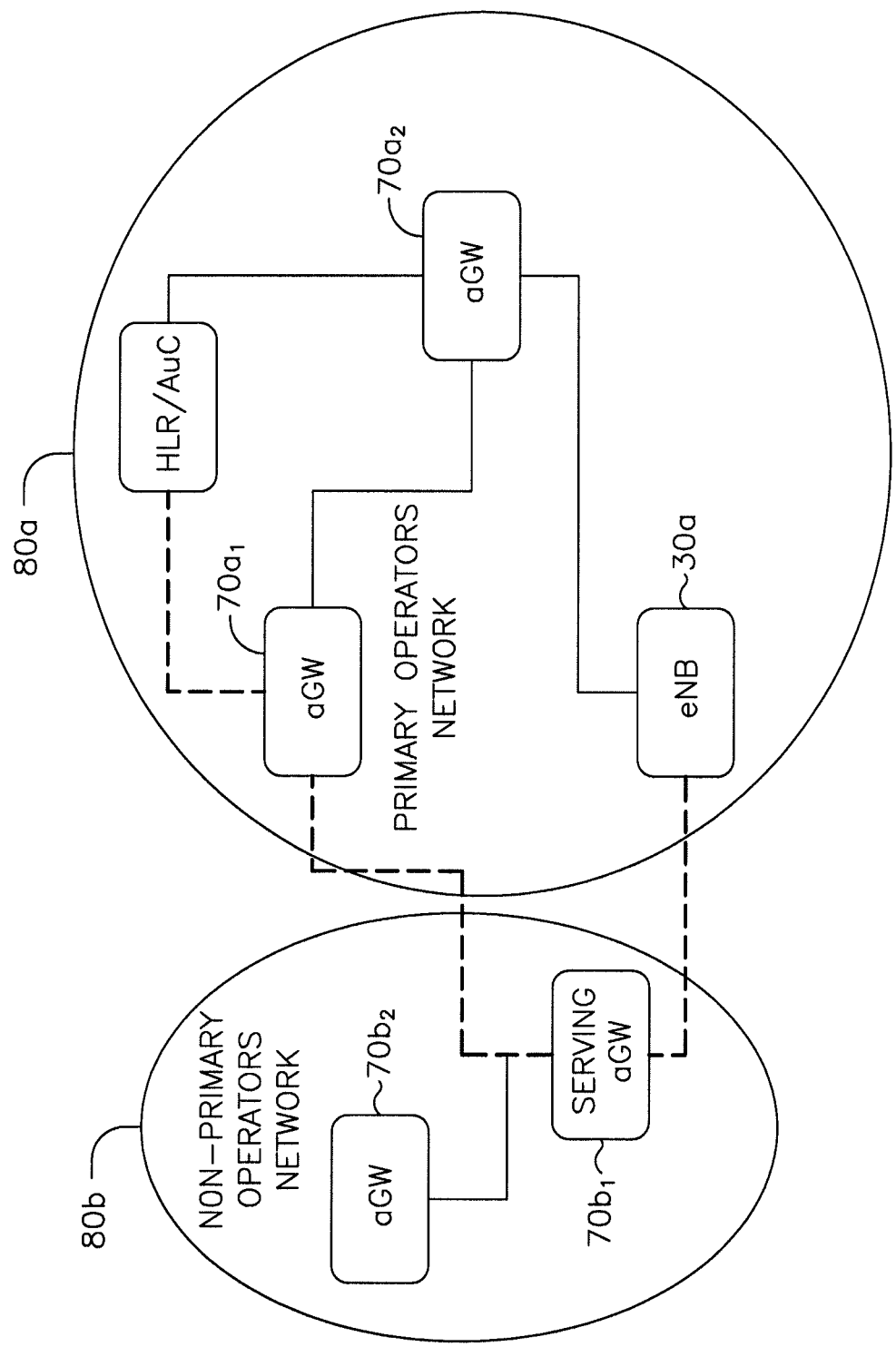
FIG. 5 is an example block diagram of a Serving aGW in a non-primary operator's network.

Alternatively, via pre-arrangement, an aGW 70$b_1$, 70$b_2$ in non-primary operator network 80b may also respond to the "Serving aGW Resolution Request" from eNB 30a with a positive response (i.e. serving-aGW=TRUE). If there is not an aGW in the primary operator's network 80a responding with a claim of being the serving aGW, then self configuring eNB 30a may take the response of non-primary operator aGWs 70$b_1$, 70$b_2$ seriously and consider responding aGW 70$b_1$ or 70$b_2$ as the serving aGW for pursuing all subsequently described actions. As illustrated in FIG. 5, in accordance with this alternative method, eNB 30 serving a GW 70$b_1$, would pursue authentication and E-UTRAN operating parameter acquisition, for example.

To LTE system 20, authentication of a new eNB 30a, or a restarting eNB, is a necessary network security procedure. As those having skill in the art know, security threats to an eNB are not as great as those to a WTRU generally for the following reasons:

the wired configuration provides point to point communication, which is much more difficult to perform free listening, tracking, security key and ciphering break. Therefore, the challenge and response authentication protocol used for a WTRU authentication shall be sufficient for eNB authentication;

unlike WTRUs, the geographical location of an eNB is generally fixed, and if it is detected as changed (except the first deploying moment or subsequent scheduled eNB relocation), it may be a sign of trouble (a security fraud usually is not committed at the same place in a visible open location of an eNB), a property that may be used as a security parameter; and since the S1 link 40 interface is protected by the underlying IPsec, no specific security keys/ciphering agreement are needed over the S1 link at the application protocol level, and as a result, no LTE specific security key agreement is needed during the eNB-network authentication.

Figure 6:
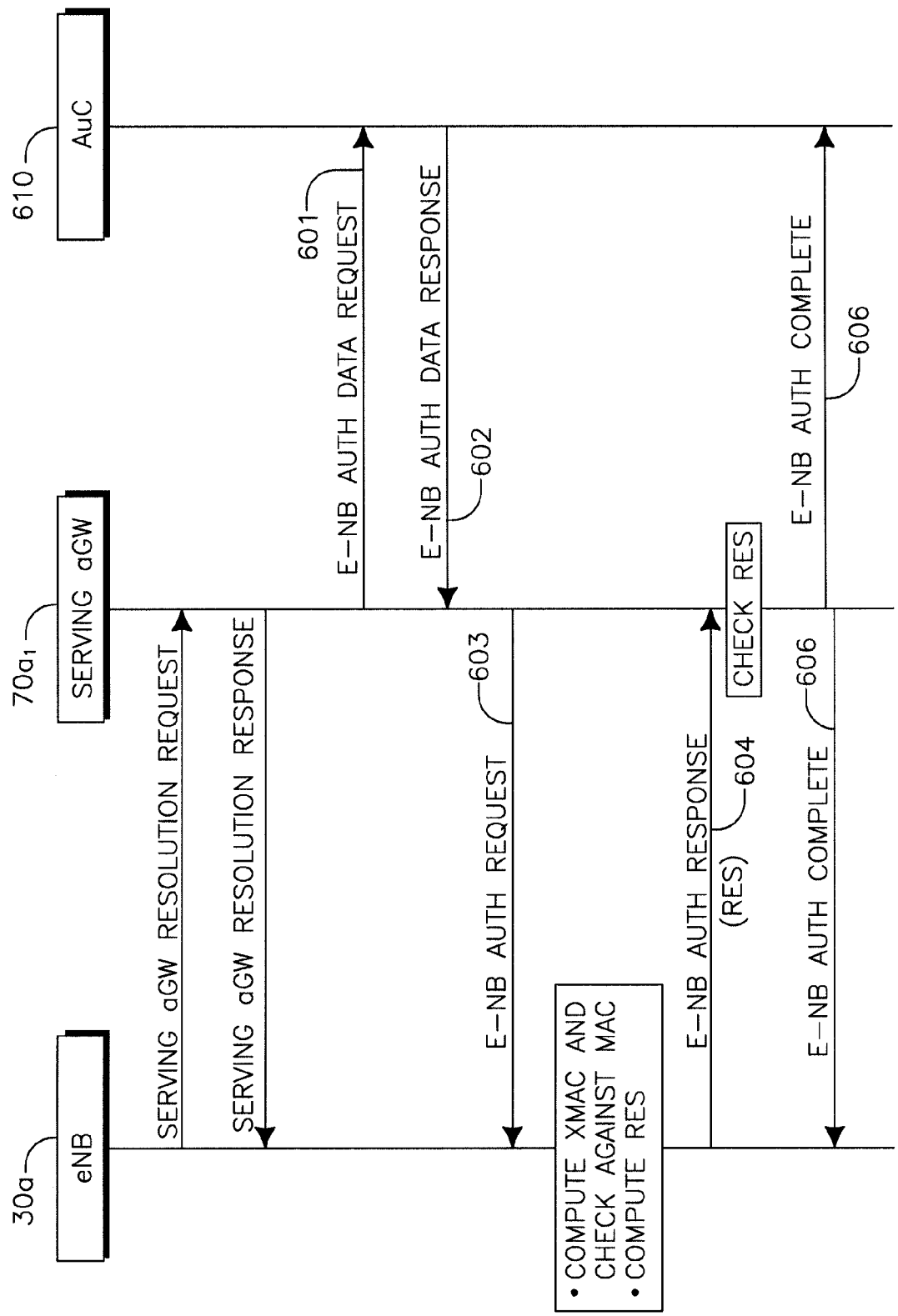
FIG. 6 is an example diagram for eNB authentication with an aGW and Authentication Center (AuC)

Given the above, a method for authenticating self configuring eNB 30a is disclosed. An example signal diagram of this disclosed method is illustrated in FIG. 6. AS disclosed above, eNB 30a establishes its service aGW through the sending of the serving aGW resolution request, which may include a Req_type, eNB-ID, PLMN-Id and/or a eNB—location-Id, and receiving from serving aGW $70a_1$ a serving aGW resolution response. eNB authentication is then initiated from serving aGW $70a_1$ at the triggering of any of the following:

a new eNB self configuring or a eNB relocation start with a serving aGW request providing the eNB-location-Id (generated from the GPS on these two occasions); or a restarting eNB or a relocating eNB transmitting a Serving aGW Resolution request.

Serving aGW $70a_1$ then sends an eNB Auth Data request 601 to the authentication center (AuC) 610 including eNB 30a identities, e.g., eNB-Id and eNB Location-Id. AuC 610 then generates the authentication parameters and sends them to serving aGW $70a_1$, which are included in an E-NB Auth. Data Response signal 602. Serving aGW $70a_1$ starts the authentication with self configuring eNB 30a by forwarding an E-NB Auth Request signal 603, which includes a Random number (RAND).

eNB 30a then computes an expected medium access control (MAC) (XMAC) and a Response (RES), checks the computed XMAC against a MAC, and sends the computed RES included in an E-NB Auth Response signal 604 to Serving aGW $70a_1$. Serving aGW $70a_1$ checks the RES and sends an authentication complete signal, e-NB Auth Complete 606, to eNB 30a and AuC 610 if RES is correct. Successful authentication completes with the authentication complete message. Authentication preferably fails if either one of the two checks fails, i.e., MAC or RES.

Figure 7:
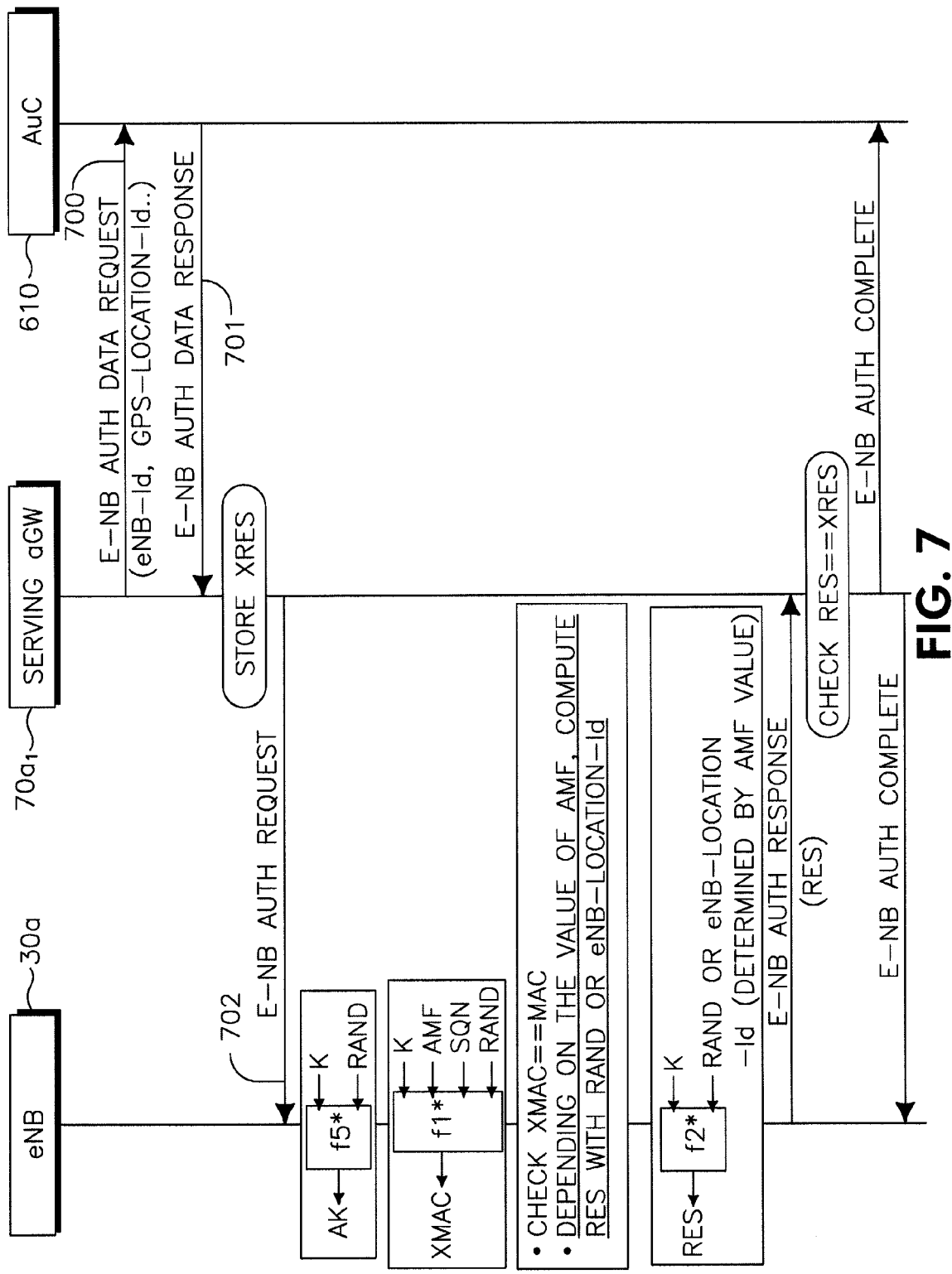
FIG. 7 is an example signal diagram for eNB-location-Id for calculating XRES/RES.

An alternative method of authenticating eNB 30a is disclosed, wherein an eNB location, preferably generated by a GPS location, may be included as a factor in the authentication calculation (RES against XRES) resulting in tighter network authentication against eNB 30a. FIG. 7 illustrates an example signal diagram of the disclosed authentication method using an eNB location Id.

Referring to FIG. 7, the disclosed method may be triggered by eNB 30a requesting to change its serving aGW, for example. Upon receipt of such a request, serving aGW $70a_1$ forwards an E-NB Auth Data Request 700, which includes the eNB location-Id measured by eNB 30a and the eNB-ID, to AuC 610. AuC 610 then generates a sequence number (SQN) and a random number (RAND). An authentication management field (AMF) is then determined, and a MAC and RES encoded. In accordance with the teachings of this method, the XRES generated by AuC 610 via shared secret key K and the random number RAND running f2 algorithm, as known to those having skill in the art, may either be encoded by the RAND or by the normalized eNB-location-Id. The decision to use the RAND or eNB-location-Id is preferably dependant on the value of AMF, which is used to convey the authentication protocol information.

A trigger for employing the eNB-location-Id for XRES/RES may originate from serving aGW $70a_1$ on special occasions, such as the serving aGW relocation, eNB initial deployment, restart or eNB relocation, or detection/report of unusual activities at the concerned eNB.

AuC 610 encodes the AMF for the XRES generation, using RAND, or using eNB-location-Id, in accordance with this method, and forwarded serving aGW $70a_1$ in an eNB Auth Data Response 701. The AMF value, included in an E-NB Auth Request signal 702, is then sent to eNB 30a for decoding the XMAC as well as for determining whether to use RAND or use eNB-location-Id for computing the RES value. Employing the eNB-location-Id (which is not transferred at the authentication request to eNB) in the XRES computation makes an attempt to impersonate an eNB very difficult.

Referring to FIG. 7, it should noted that the f1*, f2* and f5* functional blocks indicate the current f1, f2 and f5 algorithm functions used in UMTS can still be used for the same purpose. Alternatively, other security algorithms with the same inputs and outputs can also be used to calculate the (X)MAC, (X)RES and AK.

Figure 8:
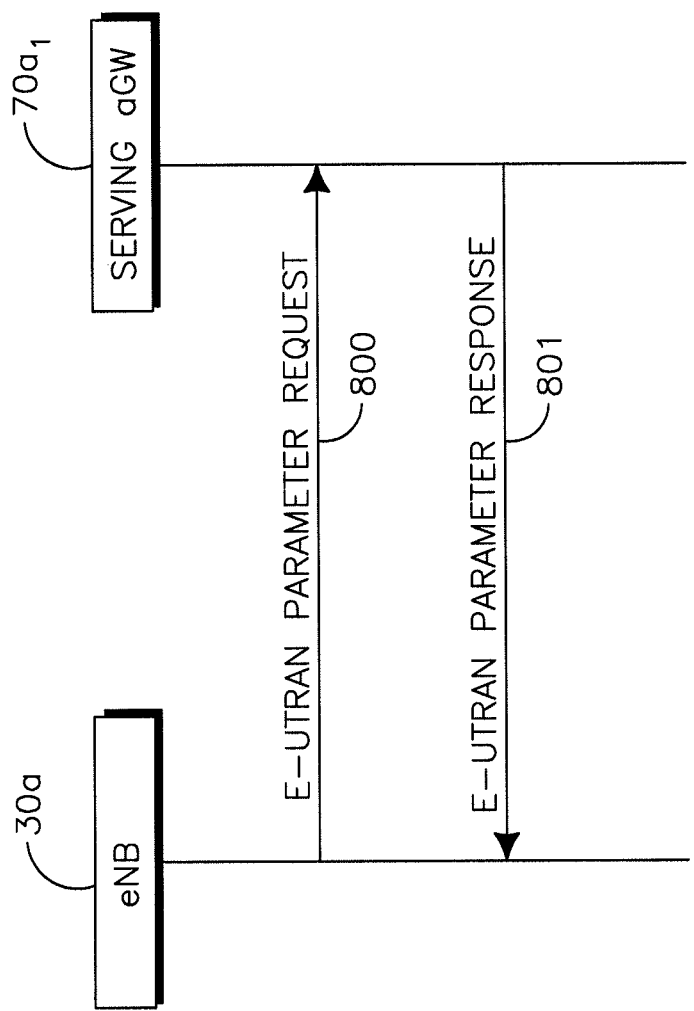
FIG. 8 is an example signal diagram for E-UTRAN Parameter Request.

The disclosed self configuring eNB 30 retrieves operating parameters for the E-UTRAN in order to attach to, interact, and operate with E-UTRAN elements, for example. Other network operators 80b (and their aGWs $70b_1$, $70b_2$). When self configuring eNB 30a has successfully authenticated with the primary operator's network 80a (when it receives the authentication complete message), eNB 30a may request the other network operator's 80b operating parameters from serving aGW $70a_1$. These include parameters for operating with non-serving aGWs $70b_1$, $70b_2$ (MME and their UPEs) as well as various neighboring eNBs 30b, 30c LTE or non-LTE. FIG. 8 is an example signal diagram of a disclosed method for a self configuring eNB to retrieve the operating parameters.

Referring to FIG. 8, self configuring eNB 30a sends an E-UTRAN Parameter Request 800 to serving aGW $70a_1$ including the identities of the respective EPC/aGW and the identities of the eNB-Ids, for whom the interacting policies, and operating parameters are requested. Serving aGW $70a_1$ responds by sending an E-UTRAN Parameter Response signal 801 including the operating parameters for the respective aGWs and eNBs requested. Example categories of operating parameters may include the following:

For the primary operator aGWs:
  U-plane traffic handling parameters;
  CN-NAS specific information; and
  LCS and MBMS operation information;
For Non-primary operator's aGWs
  Policies towards the non-primary aGWs such as charging policy, security settings, handover policies and settings;
  U-plane traffic handling behaviors, routing priorities, throughput limit, handover behaviors; and
  CN-NAS specific information towards that specific PLMN;
Neighboring eNB/Cell Information
  Information on the association among networks (PLMN-Id), tracking area (TA-Id) and neighboring cells (Cell-Id);

UE security parameters;

Neighboring cells policies such as base stations could have handover with (LTE eNBs with X2 links and 2G/3G cells whose SGSN has a S3 connection with a connecting aGW), base stations could only do cell reselection with, and the like; and Cell operating frequency and cell bandwidth requirement, other RF related parameters, power parameters such as limits and thresholds, and the like.

Although the features and elements of the present invention are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for self configuring an evolved Node B (eNB) comprising:
    sending a first message, from the eNB to initiate a connection to a gateway node, to an Internet Protocol (IP) address or fully qualified domain name; wherein the IP address or fully qualified domain name is stored in the eNB;
    after sending the first message:
    establishing the connection with the gateway node,
    sending a second message from the eNB to the gateway node; wherein the second message includes location information regarding a location of the eNB, wherein the location information includes an eNB identifier, latitude information and longitude information; and
    receiving, by the eNB from the gateway node, a third message including operating parameters associated with a serving node for self-configuring the eNB after sending the second message, wherein the included operating parameters are chosen in accordance with the location information of the eNB.

2. The method of claim 1, further comprising:
    after establishing the connection, retrieving the operating parameters from an operator; wherein the operating parameters include cell operating frequency and cell bandwidth.

3. The method of claim 2, wherein the operating parameters further include power parameters.

4. The method of claim 2, wherein the operating parameters further include MBMS parameters.

5. The method of claim 2, wherein the operating parameters further include handoff parameters.

6. The method of claim 1, wherein the gateway node is a serving gateway.

7. The method of claim 1, wherein the gateway node is an access gateway.

8. The method of claim 1, wherein the location information is used to perform location verification of the eNB.

9. The method of claim 1, wherein the second message further includes identity information regarding the eNB.

10. The method of claim 9, wherein the identify information and the location information are used to perform identity and location verification of the eNB.

11. The method of claim 1, wherein the sending of the first message is in response to powering-on of the eNB.

12. An evolved Node B (eNB) comprising:
    a transmitter, a receiver and a processor configured to:
    send a first message, to initiate a connection to a gateway node, to an Internet Protocol (IP) address or fully qualified domain name; wherein the IP address or fully qualified domain name is stored in the eNB;
    after sending the first message:
    establish the connection with the gateway node;
    send a second message to the gateway node; wherein the second message includes location information regarding a location of the eNB, wherein the location information includes an eNB identifier, latitude information and longitude information; and
    receive, from the gateway node, a third message including operating parameters associated with a serving node for self-configuring the eNB after sending the second message, wherein the included operating parameters are chosen in accordance with the location information of the eNB.

13. The eNB of claim 12, wherein the receiver and the processor are configured to:
    after establishing the connection, retrieve the operating parameters from an operator; wherein the operating parameters include cell operating frequency and cell bandwidth.

14. The eNB of claim 13, wherein the operating parameters further include power parameters.

15. The eNB of claim 13, wherein the operating parameters further include MBMS parameters.

16. The eNB of claim 13, wherein the operating parameters further include handoff parameters.

17. The eNB of claim 12, wherein the gateway node is a serving gateway.

18. The eNB of claim 12, wherein the gateway node is an access gateway.

19. The eNB of claim 12, wherein the location information is used to perform location verification of the eNB.

20. The eNB of claim 12, wherein the second message further includes identity information regarding the eNB.

21. The eNB of claim 20, wherein the identify information and the location information are used to perform identity and location verification of the eNB.

22. The eNB of claim 12, wherein the transmitter and processor are configured to send the first message in response to powering-on of the eNB.

* * * * *

UNITED STATES PATENT AND TRADEMARK OFFICE
CERTIFICATE OF CORRECTION

| | | |
|---|---|---|
| PATENT NO. | : 8,977,839 B2 | Page 1 of 1 |
| APPLICATION NO. | : 11/875693 | |
| DATED | : March 10, 2015 | |
| INVENTOR(S) | : James Miller et al. | |

It is certified that error appears in the above-identified patent and that said Letters Patent is hereby corrected as shown below:

On the title page

In the Nokia "Discussion of Threats..." reference, on page 2, col. 2, line 63, the phrase "TSG-SA WG3 Security - 53#42" should be replaced with --TSG-SA WG3 Security - S3#42--.

In the claims

In claim 1, at column 7, line 54, the phrase "gateway node, to an Internet Protocol" should be replaced with --gateway node, including an Internet Protocol--.

In claim 1, at column 7, line 55, the phrase "qualified domain name; wherein" should be replaced with --qualified domain name, wherein--.

In claim 1, at column 7, line 61, the phrase "node; wherein" should be replaced with --node, wherein--.

In claim 12, at column 8, line 32, the phrase "node, to an" should be replaced with --node, including an--.

In claim 12, at column 8, line 33, the phrase "domain name; wherein" should be replaced with --domain name, wherein--.

In claim 12, at column 8, line 37, the phrase "gateway node; wherein" should be replaced with --gateway node, wherein--.

Signed and Sealed this
Twenty-first Day of July, 2015

Michelle K. Lee
*Director of the United States Patent and Trademark Office*